United States Patent [19]

Congdon

[11] 4,439,032
[45] Mar. 27, 1984

[54] PORTABLE CAMERA SUPPORT

[75] Inventor: Jon M. Congdon, Kings County, Wash.

[73] Assignee: PEDCO, Seattle, Wash.

[21] Appl. No.: 424,619

[22] Filed: Sep. 27, 1982

[51] Int. Cl.³ ............................................. G03B 17/00
[52] U.S. Cl. .................................... 354/293; 248/166
[58] Field of Search ................... 354/81, 82, 269, 293; 352/243; 248/166, 434, 168, 170

[56] References Cited

U.S. PATENT DOCUMENTS

| | | | |
|---|---|---|---|
| 1,170,096 | 2/1916 | Nicholson | 248/166 X |
| 3,351,988 | 11/1967 | Jamieson | 354/293 X |
| 3,966,101 | 6/1976 | Taylor | 354/293 X |
| 4,029,246 | 6/1977 | Woodruff | 354/293 |

FOREIGN PATENT DOCUMENTS 872652 4/1953 Fed. Rep. of Germany ...... 354/293

Primary Examiner—John Gonzales
Attorney, Agent, or Firm—Seed and Berry

[57] ABSTRACT

A portable camera support includes a conventional camera mounting assembly affixed to a stationary leg/-securing strap/extendible leg combination. The support is alternately operable in a retracted position for securing to a companion object with the aid of the securing strap or an extended position for independently supporting a camera. The extendible legs are pivotally mounted to the stationary leg and preferably include means for stopping their inward and outward rotation.

8 Claims, 4 Drawing Figures

U.S. Patent     Mar. 27, 1984     4,439,032
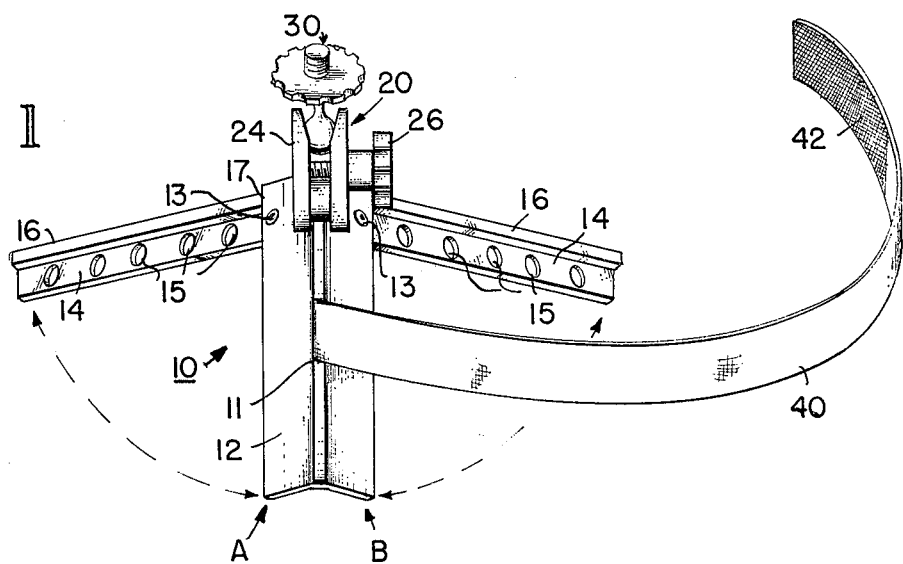
FIG. 1
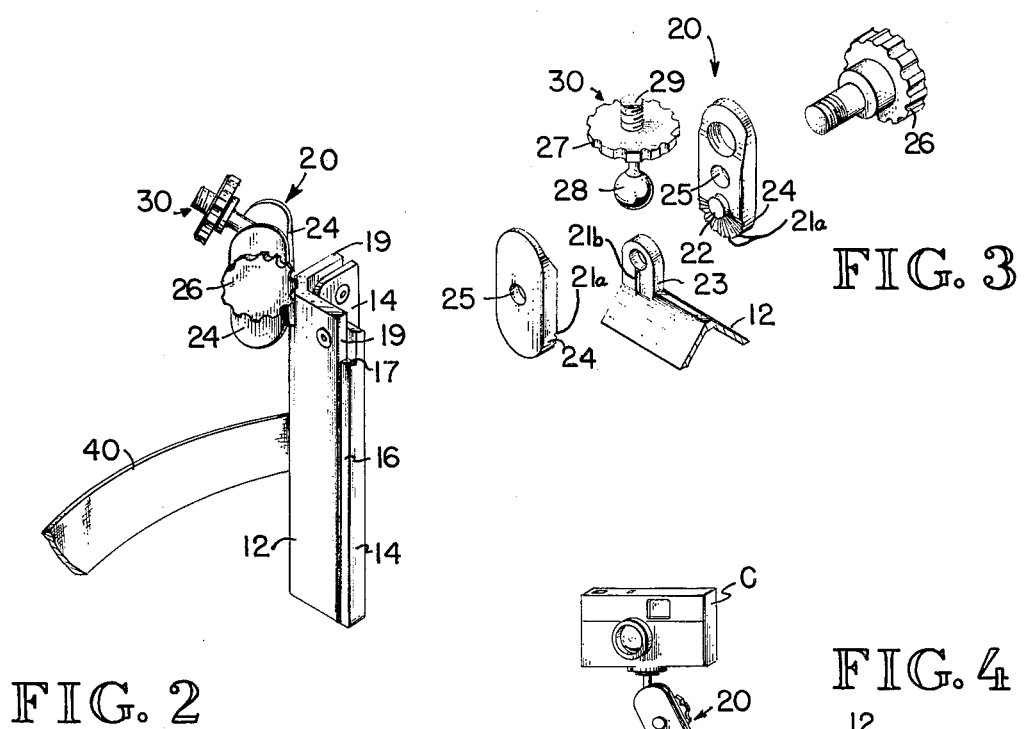
FIG. 2
FIG. 3
FIG. 4

PORTABLE CAMERA SUPPORT

DESCRIPTION

1. Technical Field

This invention relates to apparatus for supporting a camera or the like, and more particularly, to a portable apparatus having legs which may be secured in a retracted position to a companion object to support a camera or, alternately, moved into an extended position for independently supporting a camera.

2. Background Art

Camera supports have long been used by photographers to hold cameras steady while taking photographs. It is important that a camera be held as steady as possible when a photograph is being exposed, as any movement of the camera will produced blurred images on the photograph. Although the requisite degree of steadiness can often be obtained by hand-holding a camera, camera supports are especially helpful when using long exposure times, bulky cameras, or cameras without smooth shutter actuation mechanisms.

Traditionally, the most popular type of camera support has been the tripod, which comprises a camera mounting assembly supported by a trio of support legs. Conventional camera mounting assemblies include a threaded shaft of standardized size for mating with a correspondingly sized fitting on a camera and a ball and socket mechanism or the like to permit the camera to be rotated and inclined once it is mounted on the tripod. Although conventional tripods function well as camera supports, their size and bulk make them inconvenient for many uses. As small, lightweight cameras have become increasingly popular, the demand for similarly portable camera supports has increased. Backpackers, climbers, skiers and other photographers with strict space and weight limitations have sought portable camera supports which will permit self-portraits in remote locations or photographs using longer exposures. Even photographers with less stringent space and weight requirements have sought stable portable camera supports which can be conveniently brought along their cameras rather than remaining in a closet alongside their full-sized tripods.

Several types of portable camera supports have been developed in recent years to meet this demand. Small C-clamps with camera mounting assemblies affixed to the body thereof have been developed. Modifications of this design include C-clamps having a pair of short tripod legs which extend out of the body of the C-clamp to support it in an upright position on flat surfaces. Another type of portable camera support that has been developed is the ski pole camera clamp. These clamps comprise housings which fit over the bottom end of a ski pole. Threaded shafts project from the exterior of the housing for mounting a camera thereon.

Although these portable camera supports are an improvement over full-sized tripods for outdoor use because of their portable nature, they lack the versatility and utility which is optimally desired. The ski pole camera clamp, for example, is usable only in conjunction with a ski pole and requires that the ski pole be planted upside-down in the snow for use. Should one be hiking rather than skiing, or should the snow be iced over such that the handle of the ski pole cannot be readily inserted into the snow, the ski pole camera clamp is of little or no use. The C-clamp supports, to remain lightweight, must have relatively small jaws. Thus, they are not well suited for use with companion objects, such as tree limbs, which may have diameters wider than the jaws of the C-clamps. Additionally, opening the jaws completely from a closed position may require time that is essential in capturing a desired shot with the camera.

Thus there remains a need for a lightweight, portable camera support which is versatile enough to be set up quickly for use with a wide variety of companion objects and additionally will function as an independent support.

DISCLOSURE OF INVENTION

It is an object of this invention to provide a lightweight camera support which can be easily and conveniently transported by the user.

It is another object of this invention to provide such a support which can be readily secured to companion objects to serve as a camera support.

It is another object of this invention to provide such a support which can additionally support a camera independently of any companion objects.

These and other objects of the invention, which will become more apparent as the invention is more fully described below, are obtained by providing a portable camera support which is alternately operable in either a retracted position for securing to a companion object to support a camera or an extended position for independently supporting the camera. The portable support includes a conventional camera mounting assembly which is affixed to a stationary leg and extendible leg combination. Extendible legs abut a stationary leg when in a retracted position to preferably provide a contact surface between the portable support and the companion object. A securing strap is preferably fabricated of Velcro and extends from the stationary leg to surround the portable support and the companion object to firmly and releasably secure the portable support to the companion object.

The extendible legs are pivotally mounted to the stationary leg, preferably near one end thereof, to allow extension of the extendible legs to form a tripod for independently supporting a camera mounted thereon. The extendible legs preferably include means for stopping the extension thereof to ensure stability of the portable support when in an extended position.

BRIEF DESCRIPTION OF THE DRAWINGS

FIG. 1 is an isometric view of a preferred embodiment of the portable camera support of this invention in an extended position.

FIG. 2 is an isometric view of a preferred embodiment of the portable camera support of this invention in a retracted position.

FIG. 3 is an exploded view of the camera-mounting assembly of the portable camera support of FIGS. 1 and 2.

FIG. 4 is an isometric view illustrating a camera mounted on a portable camera support of this invention when secured to a companion object, such as a tree limb, by the securing strap.

BEST MODE FOR CARRYING OUT THE INVENTION

A portable camera support embodying the present invention is illustrated in FIG. 1 in an extended position. A camera mounting assembly 20 is supported by a pair of extendible legs 14 and a stationary leg 12. The extendible legs 14 are pivotally mounted on the stationary leg 12 by pins 13 and may be rotated from the extended position illustrated in FIG. 1 into a retracted position, as seen in FIG. 2. A camera mounted on the camera mounting assembly 20 can be supported independently on a generally level surface by placing the camera support 10 in the extended position illustrated in FIG. 1. Alternately, it can be supported by the camera support 10 in combination with a companion object, such as a tree limb L, by placing the camera support in the retracted position illustrated in FIG. 2 and securing it to a companion object as illustrated in FIG. 4.

As seen in FIG. 2, the stationary leg 12 of the portable camera support 10 is substantially V-shaped in transverse cross-section to provide two surfaces against which the extendible legs 14 can compactly rest. The surfaces are skewed acutely with respect to one another so that the extendible legs 14 will pivot outwardly to form a stable tripod. Additionally, as seen in FIG. 1, the triangular shaped cross-section creates two contact points A,B between the stationary leg 12 and a generally level surface when the portable camera support 10 is used as a tripod. This dual contact point arrangement is preferred in that it provides added stability, which is important for small tripods.

In a preferred embodiment illustrated in FIGS. 1-4, the extendible legs 14 are pivotally mounted on the stationary leg 12 such that they abut the interior surfaces of the stationary leg 12 when they are in a retracted position. Although this arrangement is preferred in that it allows the securing strap (described below) to be easily and tightly wrapped around the portable camera support 10 for securing it to a companion object, the extendible legs 14 could be pivotally mounted to the stationary leg 12 such that they abutted the exterior surfaces of the stationary leg 12 without departing from the spirit of the invention.

The extendible legs 14 include an elongated ridge 16 extending along the outer edge thereof, as seen in FIGS. 1 and 2. The ridge 16 terminates inward rotation of the extendible legs 14 and preferably projects a distance equal to the width of the stationary leg 12 so as to be flush with the exterior surface of the stationary leg 12 when the extendible leg 14 is retracted. (See FIG. 2.) The ridge 16 terminates longitudinally near the location of pin 13 to form stop 17. As the extendible legs 14 are extended outwardly, stops 17 will engage the sides 19 of the stationary leg 12 to prevent further extension of the extendible legs 14. The location of the stops may be varied in accordance with the desired angle between the stationary leg 12 and the extendible legs 14, although an angle of slightly greater than 90 degrees has been found to work well. Extendible legs 14 also include apertures 15 therein to reduce the weight of the portable camera support 10.

When the portable camera support 10 is used in the retracted position, it is secured to a companion object using securing strap 40. Securing strap 40 extends outwardly from the stationary leg 12. An aperture 11 is preferably located within the stationary leg 12 to allow the securing strap 40 to pass therethrough. A cotter pin (not shown) or other similar device is secured to one end of the securing strap 40 and positioned on the interior side of the stationary leg 12 to prevent the securing strap 40 from extending completely through the aperture 11. The securing strap 40 is preferably fabricated of Velcro material to facilitate securing the portable camera support 10 to companion objects of varying sizes. As seen in FIG. 1, an adhesion region 42 on the distal end of the securing strap 40 allows the securing strap 40 to be tightly wrapped around companion objects of varying size to secure the portable camera support 10 to such objects. The overall length of the securing strap 40 will be determined by the size of the companion objects to which the user desires to secure the portable camera support 10. For many outdoor uses, however, a securing strap of 11 or 12 inches in length has been found to be suitable. It will be obvious to those ordinary skill in the art that the securing strap 40 could be fabricated of materials other than Velcro without departing from the spirit of the invention. Any known means of securing the securing strap 40 to the portable camera support 10 after the securing strap 40 has been wrapped around the companion object and a portable camera support 10 will suffice, although a Velcro material is preferred because of its fastening ease and variability.

The camera mounting assembly 20 of the portable support 10 is shown in FIG. 3. The camera mounting assembly 20 includes a shaft pin 30 having a threaded shaft 29 on the projecting end thereof. At the opposite end of the shaft pin 30 is a ball 28 which is held in a socket formed by the interior surfaces of socket plates 24. Each socket plate 24 includes a button 22 which projects inwardly from the interior surface of the socket plate 24. The buttons 22 extend through an aperture in an ear 23 which extends outwardly from one end of the stationary leg 12, as seen in FIG. 3. Securing screw 26 extends through apertures 25 in each socket plate 24 to hold the camera mounting assembly together. The securing screw 26 may be loosened to permit rotation of the socket plates 24 with respect to the ear 23 and movement of the ball 28 within the socket formed by the socket plates 24.

A plurality of index notches 21a extend radially outward from the lower half of button 24 on one socket plate 24. These index notches 21a, as well as correspondingly placed index notches 21a on the other socket plate 24, engage index keys 21b which project from each side of ear 23, as seen in FIG. 3. As the socket plates 24 are rotated with respect to the ear 23, each index key 21b will engage one of the index notches 21a to hold the socket plates 24 in place. In the embodiment illustrated in FIG. 3, index notches 21a are positioned at 15° intervals to facilitate incremental inclination of a camera mounted on the camera mounting assembly.

Thus, by loosening the securing screw 26, a camera mounted on the threaded shaft 29 may be rotated and entwined with respect to the stationary leg 12. Circular plate 27 is preferably positioned on the shaft pin 30 below the threaded shaft 29 to provide additional support for the base of a camera mounted on the threaded shaft 29.

Although the invention has been described herein with respect to a particular embodiment, it will obvious to those of ordinary skill in the art that many modifications could be made to the disclosed embodiment without departing from the spirit of the invention. A different camera mounting assembly, for example, could be used without departing from the spirit of the invention. It is not intended that the invention be limited to the specific embodiment disclosed herein, but rather that it includes all equivalent devices within the spirit of the invention.

I claim:

1. A portable support for a camera or the like which comprises:
   a stationary leg including a pair of elongated surfaces skewed acutely with respect to one another;
   a pair of extendible legs pivotally mounted to the stationary leg for movement into extended and retracted positions such that the extendible legs abut the elongated surfaces of the stationary leg when the extendible legs are in a retracted position and the extendible legs combine with the stationary leg to form a tripod when the extendible legs are in an extended position;
   a securing strap having one end attached to the stationary leg, the securing strap including means for variably securing the portable support to a companion object when the extendible legs are in a retracted position; and
   a camera mounting assembly affixed to the stationary leg for releasibly mounting a camera on the portable support.

2. The portable support of claim 1 wherein the stationary leg has a substantially V-shaped cross-section such that it will contact a level surface at two points when the extendible legs are in an extended position.

3. The portable support of claim 1 wherein the securing strap is fabricated of Velcro material.

4. The portable support of claim 1 wherein the extendible legs include stops for terminating the outward extension of the extendible legs.

5. The portable support of claim 4, additionally including a ridge projecting outwardly from each extendible leg the ridge terminating to form the stops.

6. The portable support of claim 2 wherein the elongated surfaces of the stationary leg which the extendible legs abut when in a retracted position are on the interior of the V-shaped cross-section.

7. The portable support of claim 1 wherein the extendible legs include retraction stops for terminating the inward rotation of the extendible legs.

8. The portable support of claim 7, additionally including a ridge projecting outwardly from each extendible leg to form the retraction stops.

* * * * *